3,233,762
PRE-HAUL MOVER
James S. Cross, P.O. Box 313, Conway, S.C.
Filed Apr. 16, 1964, Ser. No. 360,387
1 Claim. (Cl. 214—85.5)

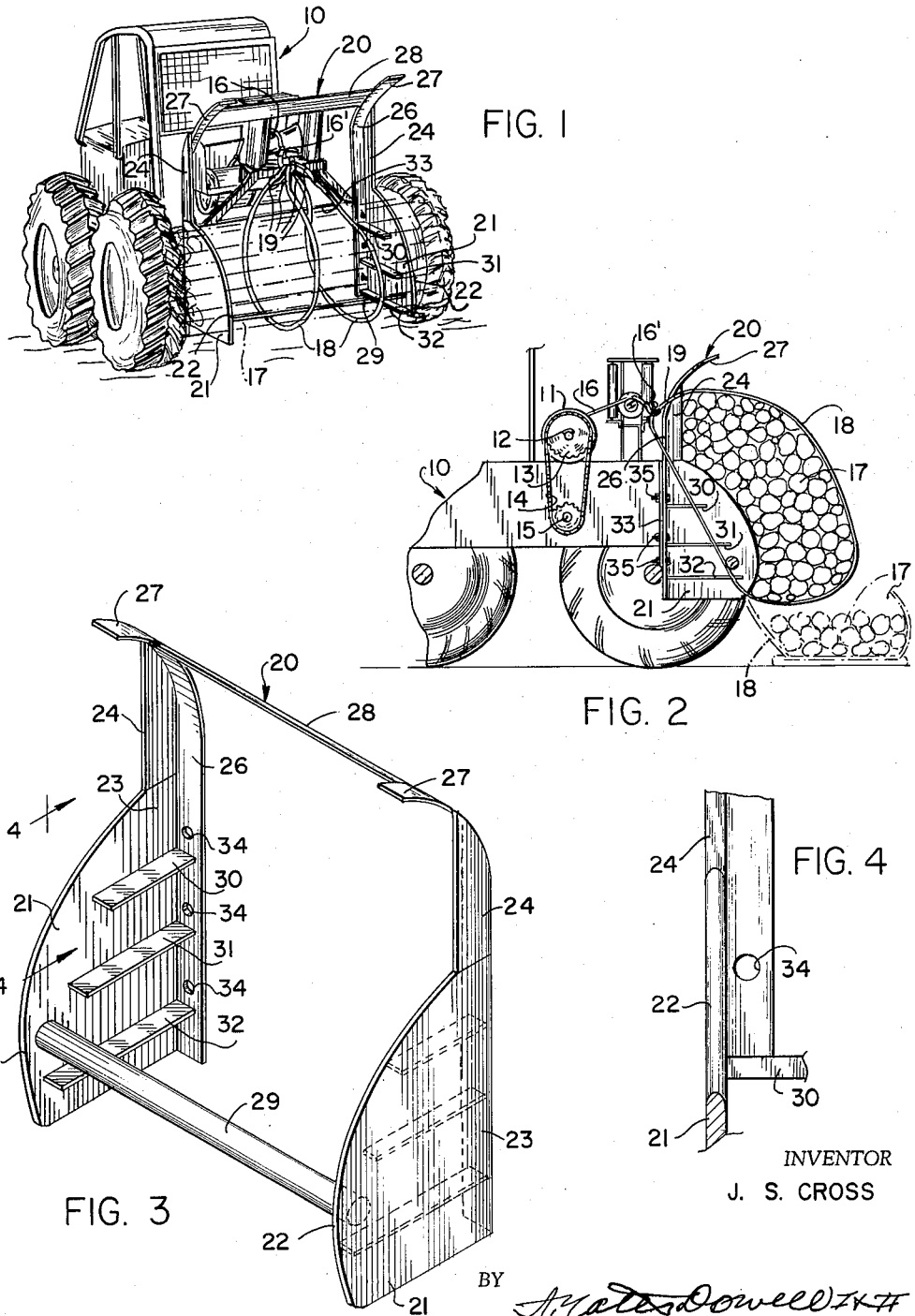

This invention relates to the cutting and transporting of trees in dense forests where the growth and terrain render the same generally inaccessible to transportation facilities, and to equipment by which logs or sections of trees are obtained and removed for subsequent use.

The invention relates particularly to the production of pulp wood and other products and to the removal of logs used for wood pulp, sugar cane, and other products cut in lengths in areas inaccessible to road or highway transportation facilities and to their removal and transportation therefrom in bulk.

As is well known, trees are felled and various forestry products are obtained from areas having various types of terrain, including those with thick growth which are swampy and otherwise inaccessible to, or which can't readily be penetrated by large road or highway transportation equipment. Thus a problem has been encountered in the removal of pulp wood from the general area in which it is grown and moving it to an area in which it is used.

It is an object of the invention to provide simple, inexpensive, readily available, practical and effective means for moving a batch or collection of logs or other elongated objects from a place where they are stacked to a place where they are more readily accessible to transportation, machinery and equipment, loading, moving, and discharging the same in an orderly condition.

Other objects and advantages of the invention will be apparent from the following description taken in conjunction with the accompanying drawing in which:

FIG. 1 is a perspective illustrating the invention applied to a tractor;

FIG. 2, a longitudinal section;

FIG. 3, a perspective of the log holder; and,

FIG. 4, a section on the line 4—4 of FIG. 3.

Briefly stated the present invention comprises apparatus for moving piles of logs a short distance or from the place where they are cut to a clearing where they can be further handled or transported, such apparatus including a tractor, mechanism for picking up a pile of cut logs and supporting them on a tractor so that they can be loaded, transported and discharged in an orderly condition. The mechanism for picking up the logs includes spaced cables connected to a power operated winch and load guiding mechanism having track forming runners so that when the cables are placed around the logs they will be caused to engage and travel along the track forming edges of the parallel guide members to a position such that they can be moved by the tractor whereupon the winch can be unwound to allow the logs to rest on the ground and the cable removed from around them, leaving the logs in an orderly stockpile for further handling.

With continued reference to the drawing, a tractor 10 of conventional construction is provided with log pick-up mechanism including a winch 11 mounted on a shaft 12 and driven by sprocket 13 and chain 14 from a sprocketed shaft 15 having a driving connection with the power take-off of the tractor. To the winch 11 is attached one end of a main line cable 16 carrying at its opposite end a C-hook 16'. Logs 17 are adapted to be stacked in an orderly condition in a pile and to be moved and left in such orderly condition for subsequent movement. In order to move these logs a pair of cables 18, of a size and strength to encircle and hold a pile of logs of the desired amount, are provided each having a loop or attaching ring 19 on each end of a size to be received in the C-hooks 16'. The cables are adapted to be inserted beneath the pile of logs and the loops placed in the C-hooks after which the logs are moved by the winch in contact with a mechanism 20 mounted on the tractor, and the tractor with the logs may be moved to a clearing accessible to further means of transportation.

The loading guiding mechanism 20 is composed of spaced generally parallel side members or plates 21 which extend rearwardly from the tractor with spaced runners or track forming edge portions 22, straight portions 23, and upright portions 24 welded or otherwise attached thereto. Each of the straight portions 23 and upright portions 24 is welded or otherwise secured to a back strip 26 having a curved upper portion 27. The curved upper portions 27 are connected by a brace 28 and the lower forward portions of the side members 21 likewise are connected by a brace 29. The plates 21 and back strips 26 are further reinforced by a series of spaced braces 30, 31 and 32.

The loading guiding mechanism 20 is adapted to be securely attached to a tractor, and in order to accomplish this a rear plate 33 is welded or otherwise secured to the tractor, and for this purpose the back strips 26 are provided with a series of spaced openings 34 in which bolts or other fasteners 35 are received.

In the operation of the device logs are cut and placed in piles in an orderly condition horizontally and thereafter the cables 18 are placed around such a pile of logs to be lifted and the winch is rotated to wind the cables thereon. This causes the logs to be brought against, and to ride up, the curved edges 22 of the plates 21 into contact with the forward edges of the uprights 24. In view of the fact that the beveled edges 22 are relatively narrow, they offer minimum resistance to the logs and require small extra force to be applied to the cables for pulling the logs onto the loading guiding mechanism. Due to the fact that the logs are soft and green, the edges 22 produce grooves in the logs as they roll and slide upwardly and these grooves serve to prevent the logs from moving endwise and reduce the probability of the logs being dislodged until the cables 18 are loosened.

It will be obvious to one skilled in the art that various changes may be made in the invention without departing from the spirit and scope thereof and therefore the invention is not limited by that which is illustrated in the drawing and described in the specification, but only as indicated in the accompanying claim.

What is claimed is:

A device for use in connection with a tractor having a power take-off, a winch driven therefrom, a main line cable having one end attached to said winch, a hook on its other end, loading cables adapted to be inserted side by side in spaced relation around a pile of logs with each loading cable having a loop at each end for application to said hook to allow said main cable to be wound on said winch for tightening said loading cables about the pile of logs and to be released by unwinding said main cable, said device comprising a rear portion and a pair of spaced side portions having rounded front edge portions located in a manner to be engaged by the logs and to produce grooves in the logs and maintain contact of the logs with said front edge portions and permitting said logs to be loaded carried and discharged in an orderly fashion.

(References on following page)

References Cited by the Examiner

UNITED STATES PATENTS

| | | |
|---|---|---|
| 2,292,882 | 8/1942 | Langdon. |
| 2,643,012 | 6/1953 | Wahl _____ 214—85.1 |
| 2,720,988 | 10/1955 | McColl _____ 214—77 |

FOREIGN PATENTS 528,385  7/1956  Canada.

GERALD M. FORLENZA, *Primary Examiner.*

MORRIS TEMIN, *Examiner.*